United States Patent [19]

Iwakuni et al.

[11] Patent Number: 5,579,012
[45] Date of Patent: Nov. 26, 1996

[54] SPEED DETECTING APPARATUS

[75] Inventors: Mikio Iwakuni, Yachiyo; Yoshihiko Baba, Nada; Masahiro Takiguchi, Yachiyo, all of Japan

[73] Assignee: Uniden Corporation, Chiba, Japan

[21] Appl. No.: 385,865

[22] Filed: Feb. 9, 1995

[30] Foreign Application Priority Data

Dec. 5, 1994 [JP] Japan .................................. 6-301128

[51] Int. Cl.⁶ ...................................................... G01S 13/60
[52] U.S. Cl. ........................................................ 342/117
[58] Field of Search ............................................ 342/117

[56] References Cited

U.S. PATENT DOCUMENTS

| | | | |
|---|---|---|---|
| 4,722,222 | 2/1988 | Purdy et al. | 73/597 |
| 4,757,714 | 7/1988 | Purdy et al. | 73/597 |
| 4,845,506 | 7/1989 | Shibata et al. | 343/713 |
| 4,980,633 | 12/1990 | Roskoni | 342/115 |
| 5,204,682 | 4/1993 | Beasley | 342/117 |

FOREIGN PATENT DOCUMENTS

| | | |
|---|---|---|
| 51-65678 | 6/1976 | Japan . |
| 59-81573 | 5/1984 | Japan . |
| 59-203973 | 11/1984 | Japan . |
| 3-46585 | 2/1991 | Japan . |
| 5-87915 | 4/1993 | Japan . |

Primary Examiner—John B. Sotomayor
Attorney, Agent, or Firm—Lowe, Price, LeBlanc & Becker

[57] ABSTRACT

A speed detecting apparatus mounted on an object moving on the ground detects a Doppler frequency for computing a moving speed thereof by receiving reflection waves of a microwave signal or a millimeter wave transmitted to the ground. The apparatus comprises a plurality of transmitting/receiving systems each having an antenna and a transmitter/receiver, and a signal processing section for computing moving speed according to Doppler frequency detected by the transmitting/receiving systems. Directivity of an antenna provided in each of the plurality of transmitting/receiving systems is set at a different angle respectively.

20 Claims, 9 Drawing Sheets

DOPPLER FREQUENCY $fd1 = \dfrac{2V0}{C} f01 \cos\theta1$ $fd2 = \dfrac{2V0}{C} f02 \sin\theta1$ DOPPLER FREQUENCY $fd = \{(2V0 \times f0)/C\} \times \cos\theta$

SPEED DETECTING APPARATUS

FIELD OF THE INVENTION

The present invention relates to a speed detecting apparatus, and more particularly to a speed detecting apparatus which can always detect accurate moving speed, affected neither by mounting angle of the apparatus nor by the posture of a person carrying the apparatus, reduces effects on speed detection by the material or conditions of the ground surface, enables intermittent operation even when the apparatus is minimized for portability, and also can improve precision in speed detection and reduce power consumption.

BACKGROUND OF THE INVENTION

A speedometer is always installed in a vehicle such as a car, a boat, or an airplane, so that moving speed can easily be detected. However, an apparatus for detecting moving speed of a man during movement of the person has not been made available. The reason is probably because it is difficult to realize a cheap, small and portable speed detecting apparatus. On the other hand, there is a need for detecting speed while a man is walking or making sports, and it has been desired to realize an apparatus satisfying this need.

Although a speed detecting apparatus carried by a moving person has not been distributed widely, there have been proposed various types of apparatus for that purpose. For instance, the U.S. Pat. No. 4,757,714 for "Speed Sensor and Head-Mounted Data display", is disclosed a speed detecting apparatus making use of the Doppler effect of electromagnetic waves, although the availability is limited to moving sportsmen.

This example of conventional technology is a Doppler speed detecting apparatus carried by a sportsman comprising a single antenna for transmitting or receiving electromagnetic waves, a Doppler transceiver section, a section for amplifying or processing detected Doppler frequency signals, and a section for displaying speed information. Also the apparatus has a construction in which antenna directivity is at a specified angle against the ground when the Doppler speed detecting apparatus is carried by a person, in order to detect relative speed between a moving sportsman and the ground.

FIG. 11 is a view illustrating a principle when speed detection is executed by this conventional type of Doppler speed detecting apparatus. In this figure, assuming that moving speed of the sportsman is v0, and angle between a direction of the antenna directivity and the ground surface is θ, a Doppler frequency fd obtained is expressed by the following expression;

$$fd = \{(2v0 \cdot f0)/C\} \cdot \cos\theta \quad (1)$$

herein f0 is frequency of electromagnetic wave transmitted from a Doppler transceiver section, while C is light velocity.

As shown in expression (1), a Doppler frequency obtained by the Doppler transceiver section changes due to the angle θ between a direction of the antenna directivity and the ground surface. As a result, in the speed information displayed on the Doppler speed detecting apparatus, an error is generated due to the posture of a carrier and mounting angle of the apparatus, which dissatisfies users of the apparatus.

In addition, surface reflection waves of transmitted electromagnetic waves do not always provide a stable signal having a constant amplitude because the antenna directivity angle is within a certain range in a Doppler transceiver section and also because the material of the ground surface (such as lawn, earth, and asphalt) is not always constant. Namely, the Doppler transceiver section contains a noise element and receives surface reflection waves with a Doppler frequency always changing and varying in signal strength. As a result, an error sometimes is generated in speed measurement by the Doppler speed detecting apparatus.

In the "Doppler speed meter" disclosed in Japanese Patent Laid Open Publication No. 65678/1976, 2 units of horn antenna to remove a speed element in a direction perpendicular to the traveling direction are provided, but as the same frequency is used, technology such as antenna polarization to evade interference between the antennas is required. Furthermore, in a speed detecting apparatus using one type of fixed frequency, the amplitude of the surface reflection wave is not always constant because of the material and state of the ground surface, and sometimes surface reflection waves not having ample amplitude may be generated.

As described above, in the case of the conventional type of speed detecting apparatus, if a small portable speed detecting apparatus is realized by making use of the Doppler effect based on microwave or millimeter waves, an error arises in speed detection due to such causes as mounting angle of a portable speed detecting apparatus, the posture of a carrier, and material conditions of ground surface (asphalt, lawn, and earth). For this reason it is not possible to accurately report the moving speed of a carrier, making it impossible to be satisfactory to a user of the speed detecting apparatus.

Also, in a speed detecting apparatus for vehicles having two units of horn antenna provided therein to remove speed elements in a direction perpendicular to the traveling direction, as the same frequency is used, a specific circuit such as a circuit for antenna polarization for evading interference between antennas is required, and sometimes accurate speed detection may become impossible due to effects by the material and state of the ground surface.

SUMMARY OF THE INVENTION

It is an object of the invention to provide a speed detecting apparatus which can obtain an accurate moving speed without being affected by mounting angle of the apparatus, posture of a person carrying the apparatus, or the other causes and also can reduce effects by the material and state of the ground surface over which speed is detected.

It is another object of the present invention to provide a speed detecting apparatus which enables intermittent operation according to an application of the apparatus even if the apparatus is minimized for portability, and also which insures precision of speed detection and reduces power consumption.

A speed detecting apparatus according to the present invention is mounted on an object moving on the ground, receives reflection wave of a microwave or millimeter waves signal transmitted to the ground and detects the Doppler frequency to detect moving speed. This speed detecting apparatus comprises an antenna, a transmitter/receiver, and a plurality of transmitting/receiving systems each with antenna directivity at a different angle respectively, and computes moving speed with a signal processing section according to the Doppler frequency detected by the plurality of transmitting/receiving systems.

A reflection factor of electric waves transmitted from a speed detecting apparatus to the ground surface (absorption of electric waves at the ground surface) depends on the state or material of the ground surface. Even if measurement of Doppler frequency is disabled in one transmitting/receiving system, measurement can be executed by any other of the transmitting/receiving systems of different antenna directivity, so that it is possible to carry out more accurate measurement of moving speed.

In a speed detecting apparatus according to the present invention, a plurality of transmitting/receiving systems each have a transmitter/receiver including a local oscillator for transmission and reception which oscillates at a different frequency respectively and detect a Doppler frequency respectively by receiving reflection waves when electromagnetic waves having a different frequency are transmitted. The signal processing section computes moving speed according to a plurality of Doppler frequencies detected by the plurality of transmitting/receiving systems.

Thus, different types of electromagnetic waves each having a different frequency are transmitted from a plurality of transmitting/receiving systems each having different antenna directivity, so that it is always possible to compute and obtain an accurate moving speed without being affected by such causes as mounting angle of the speed detecting apparatus or posture of a person carrying the apparatus. Also, as for effects by the reflection factor of the ground surface, as different types of electromagnetic waves each having a different frequency are transmitted, the reflection factor at the ground surface is different for each frequency, and even if, for instance, a reflection wave from the ground surface can be detected for only one of two different transmission frequencies, moving speed can be computed by using the mounting angle of the speed detecting apparatus and the Doppler frequency computed previously, and a more accurate moving speed can be detected.

In a speed detecting apparatus according to the present invention, each of a plurality of transmitting/receiving systems sequentially transmits electromagnetic waves having a different frequency respectively from antennas provided therein and detects a Doppler frequency by receiving reflection waves for the transmitted electromagnetic waves.

In one embodiment in which a local oscillator oscillating at one frequency is provided in one transmitting/receiving system, if, for instance, only one of the reflection waves from the ground surface for two types of transmitted electronic waves, each having a different frequency, is detected, moving speed is computed by using an installation angle of the speed detecting apparatus and a previously computed Doppler frequency.

In a speed detecting apparatus according to a second embodiment, electromagnetic waves having a different frequency are sequentially transmitted in each of a plurality of transmitting/receiving systems, and a Doppler frequency is detected by receiving the reflection waves. Hence, it is possible to compute and detect moving speed according to a practically detected value at high precision and under stable conditions.

In a speed detecting apparatus according to the present invention, a plurality of means or local oscillators for transmission/reception oscillating at different frequencies in transmitters/receivers within the plurality of transmitting/receiving systems are shared by one variable frequency oscillator. Reflection waves, when various types of electromagnetic waves each having a different frequency respectively are transmitted in the plurality of transmitting/receiving systems sequentially, are received to detect a Doppler frequency. With this scheme, the apparatus can be minimized with fewer components.

In a speed detecting apparatus according to the present invention, an oscillation frequency of a local oscillator for transmission/reception or a variable frequency oscillator in a transmitter/receiver in each of the plurality of transmitting/receiving system is identified by referring to an operating mode set in a mode setting section. With this feature, an oscillation frequency can be set according to the operating environment under which the speed detecting apparatus is actually used, and more accurate speed detection is enabled.

In a speed detecting apparatus according to the invention, control over an intermittent operation in which a driving time for each of a plurality of transmitting/receiving systems is changed is executed according to rate of change of the moving speed computed by the signal processing section. With this feature, an optimal apparatus with low power consumption best suited to an operating environment in which the speed detecting apparatus is actually used can be realized.

In a speed detecting apparatus according to the present invention, the signal processing section has a plurality of data tables, in each of which a cycle and/or a percentage of a driving time in the intermittent operation control are set according to an operating mode set in the mode setting section, and the signal processing section controls the intermittent operation according to rate of change in the computed moving speed by referring to the data tables. With this feature, an optimal apparatus with low power consumption best suited to an operating environment in which the speed detecting apparatus is actually used can be realized. As specifications for control over the intermittent operation are set in the data tables, it is easy to set specifications and carry out maintenance for the apparatus.

Other objects and features of this invention will become understood from the following description with reference to the accompanying drawings.

BRIEF DESCRIPTION OF THE INVENTION

DESCRIPTION OF THE PREFERRED EMBODIMENTS

Next, a description is made for the speed detecting apparatus according to the present invention in the order of Embodiment 1, Embodiment 2, Embodiment 3, Embodiment 4 with reference to the related drawings.

Figure 1:
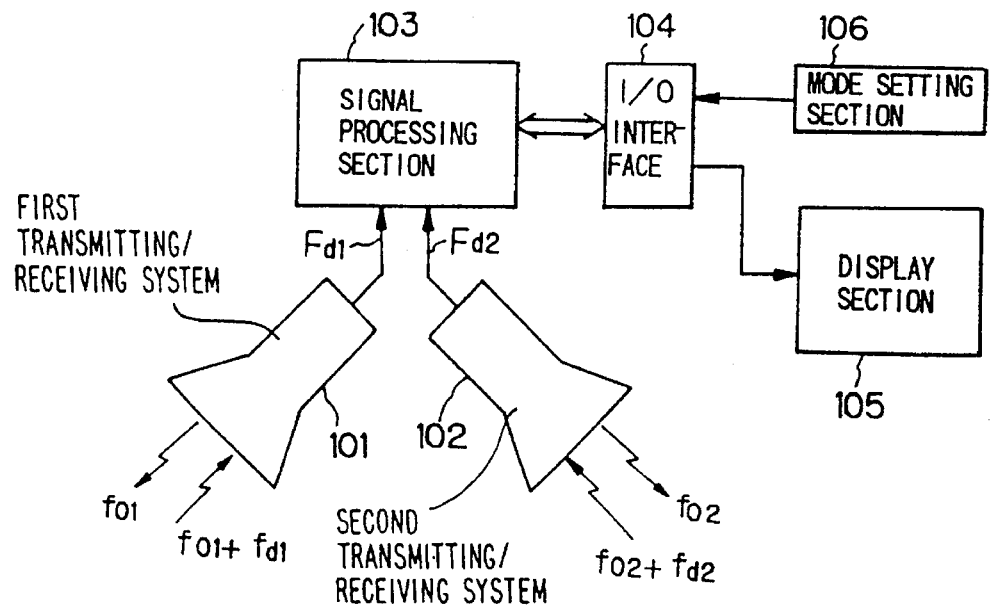
FIG. 1 is a block diagram of a speed detecting apparatus according to Embodiment 1.

FIG. 1 is a block diagram of the speed detecting apparatus according to Embodiment 1 of the present invention. The speed detecting apparatus according to the present invention is mounted to an object moving on the ground and computes the moving speed of the object by receiving reflection waves of a microwave signal or a millimeter wave signal transmitted to the ground surface, and detecting Doppler frequency.

Figure 2:
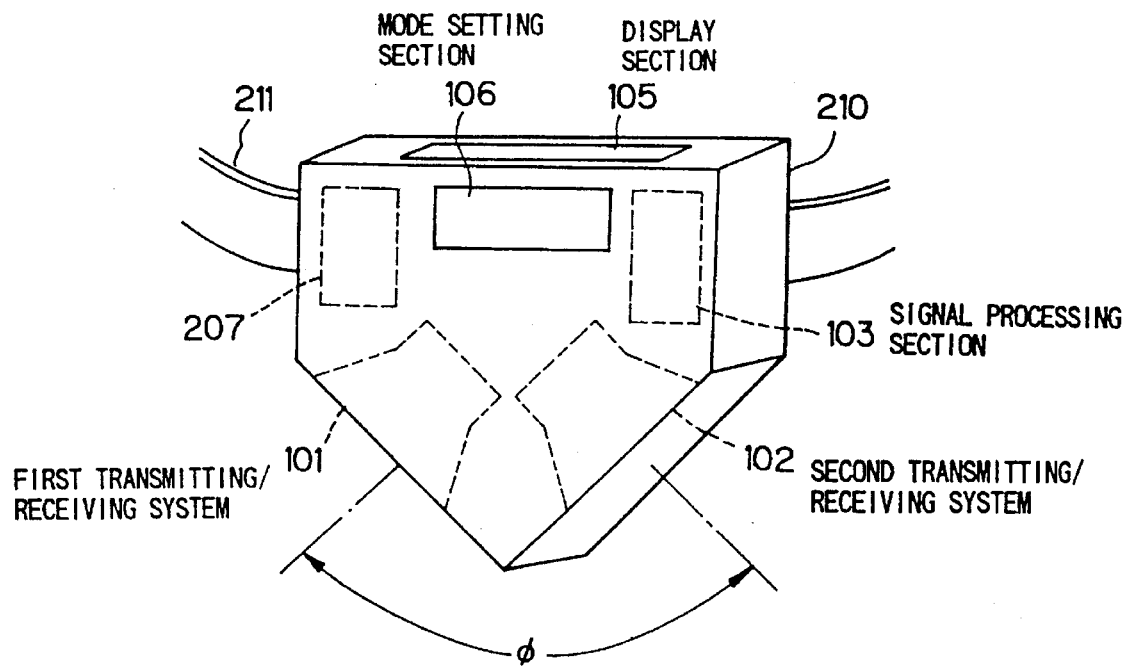
FIG. 2 is a view showing the appearance of a speed detecting apparatus according to an embodiment of the present invention.

FIG. 2 is a view illustrating the appearance of the speed detecting apparatus according to the present invention. Namely, in this embodiment, a man is assumed as an object on which the speed detecting apparatus is mounted, and the apparatus is mounted on the waist or head of the person.

In FIG. 1 and FIG. 2, the speed detecting apparatus according to the present invention comprises a first transmitting/receiving system 101, a second transmitting/receiving system 102, a signal processing section 103, an I/O interface 104, a display section 105, and a mode setting section 106. Also in FIG. 2, each of the above components is installed substantially at a position as indicated by the dashed line and solid line within a case 210 mounted on a belt 211. In this figure, the reference numeral 207 indicates a power supply unit for the speed detecting apparatus. It should be noted that antenna directivity of each of the first transmitting/receiving system 101 and the second transmitting/receiving system 102 is set at a different angle, and in FIG. 2 the antenna directivity is set at an angle φ.

Namely, the speed detecting apparatus according to the present invention, comprises a first transmitting/receiving system 101 and a second transmitting/receiving system 102, and computes moving speed according to Doppler frequency detected by the two transmitting/receiving systems 101 and 102. However, different from conventional technology (Japanese Patent Laid Open No.65678/1976), oscillation frequencies in the two transmitting/receiving systems 101 and 102 are f01 and f02 respectively, are not identical.

Figure 3:
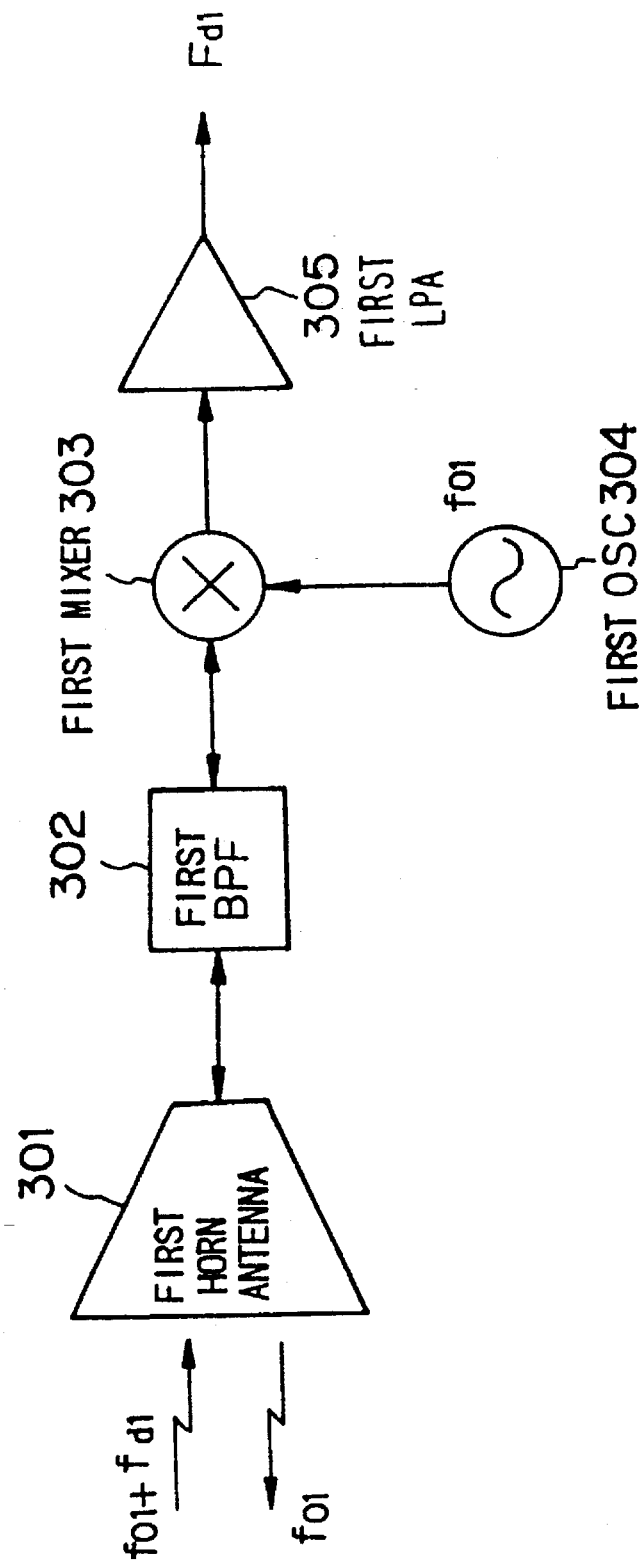
FIG. 3 is a block diagram of a first transmitting/receiving system according to Embodiment 1.

FIG. 3 is a block diagram of the first transmitting/receiving system 101. In this figure, the first transmitting/receiving system 101 comprises a first horn antenna 301, a first band pass filter (BPF) 302, a first mixer 303, a first local oscillator (OSC) for transmission/receiving 304, and a first low pass amplifier (LPA) 305. The configuration of the second transmitting/receiving system 102 is the same as that of the first transmitting/receiving system 101.

As shown in FIG. 3, in the first or second transmitting/receiving system 101 or 102 (description is made hereinafter for the first transmitting/receiving system as a representative example), a signal having a frequency f01 produced from the first local oscillator for transmission/receiving 304 is supplied to the first mixer 303. At the same time, a portion thereof is transferred to the first band pass filter 302 because of the isolation characteristics of the first mixer 303, and electromagnetic waves are transmitted from the first horn antenna 301 to space. Namely, the configuration shown in FIG. 3 is basically that of a receiver, but signal transfer from the first local oscillator 304 to the first band pass filter 302 is made as power leakage from the first mixer 303, and thus operation of a transmitter is executed.

If there is any object reflecting electromagnetic waves in front of the first horn antenna 301 and there is relative speed between the speed detecting apparatus and the object above, the frequency signal (f01) transmitted from the first horn antenna 301 is reflected by the object and returns to the first horn antenna 301, but the frequency of this reflection wave shifts to f01 +fd1 because of the Doppler effect.

The first mixer 303 outputs an output signal having frequency fd1 according to an oscillation signal (f01) from the first local oscillator 304 and a reflection wave signal (f01 +fd1). The mixer output signal is amplified by the first low pass filter 305, and then a signal Fd1 having a frequency of fd1 is outputted from the first transmitting/receiving system 101.

Figure 11:
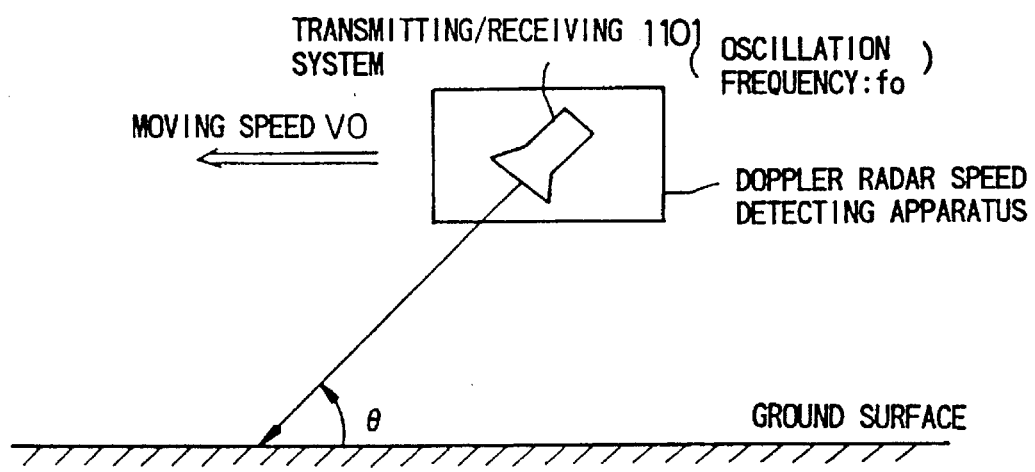
FIG. 11 is an explanatory view for explaining principles of speed detection by a conventional type of Doppler speed detecting apparatus.

Contents in the section of "Prior Art" described with reference to FIG. 11 can also be applied to this embodiment. Namely, assuming that the velocity of a speed detecting apparatus against the ground surface is v0 and an angle between direction of directivity of the first horn antenna 301 and the ground surface is θ, a Doppler frequency fd1 obtained is described by the following expression;

$$fd1=\{(2V0 \cdot f01)/C\} \cdot \cos\theta \qquad (1')$$

For this reason, even if the moving speed v0 is constant, the Doppler frequency fd1 detected is affected by the angle θ against the ground surface.

Figure 4:
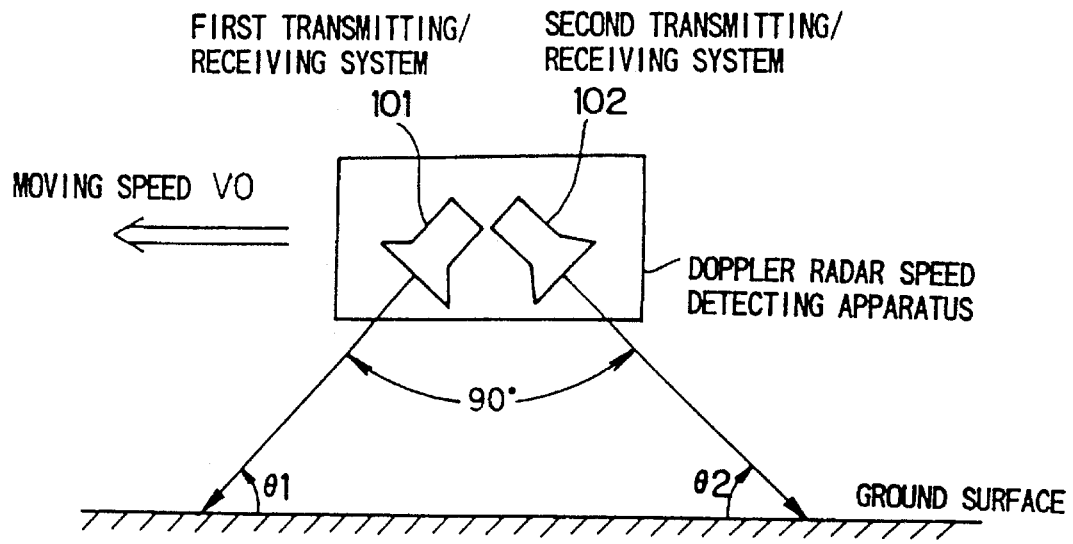
FIG. 4 is an explanatory view showing principles of operation of the speed detecting apparatus according to Embodiment 1.

FIG. 4 is an explanatory view illustrating principles of operations of the speed detecting apparatus according to the present embodiment. This figure shows the state where a speed detecting apparatus moves at a speed of v0 transmitting electromagnetic waves to the ground surface. It should be noted that a signal having a frequency of f01 is transmitted from the first transmitting/receiving system 101 and a signal having a frequency of f02 from the second transmitting/receiving system 102. Also, it is assumed herein for convenience of description that the first and second horn antennas have directions of wave propogations (directivity) displaced by an angle of 90 degrees from each other.

In the state shown in FIG. 4, the Doppler frequencies obtained the first transmitting/receiving system 101 and the second transmitting/receiving system 102 are expressed by the following respectively;

$$fd1=\{(2dv \cdot f01)/C\} \cdot \cos\theta1 \qquad (2)$$

$$fd2=\{(2v0 \cdot f02)/C\} \cdot \sin\theta1 \qquad (3)$$

Herein, θ1 indicates an angle between the wave propogation of a first horn antenna and the ground surface. For this reason, a signal Fd1 having a Doppler frequency of fd1 is outputted from the first transmitting/receiving system 101 and a signal Fd2 having a frequency of fd2 from the second transmitting/receiving system 102 respectively, and the signals are applied to the signal processing section 103.

The signal processing section 103 computes moving speed v0 of a speed detecting apparatus according to information from signals having two Doppler frequencies (fd1, fd2) inputted, and displays the moving speed v0 through the I/O interface 104.

Figure 5:
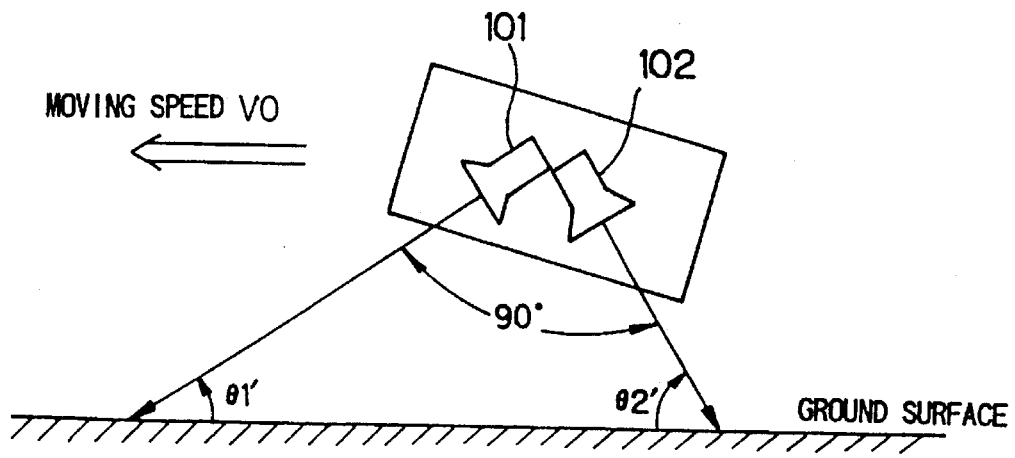
FIG. 5 is another explanatory view showing principles of operation of the speed detecting apparatus according to Embodiment 1.

FIG. 5 shows a state where the speed detecting apparatus is inclined. The Doppler frequency in this case is obtained through the expressions (2) and (3) but by changing the angle θ1 to θ1'. θ1' indicates an angle between the direction of wave propogation of the first horn antenna and the ground surface in FIG. 5.

The angle θ1 and moving speed v0 can be computed from the two types of Doppler frequency fd1 and fd2. Namely, if the following expression is satisfied;

$$fd2'=fd2\cdot(f01/f02) \quad (3')$$

the angle θ1 can be obtained through the following expression;

$$θ1=\arctan (fd2'/fd1) \quad (4)$$

and the moving speed v0 can be obtained through the following expression;

$$v0 =C\cdot fd1/\{2f01 \cdot \cos (\arctan (fd2'/fd1))\} \quad (5)$$

The expression (5) for computing the moving speed v0 indicates that the operation for computing now does not depend on the angle θ between antenna direction in a speed detecting apparatus and the ground surface and also that accurate moving speed v0 can always be detected from the two Doppler frequencies fd1 and fd2.

As described above, with the speed detecting apparatus according to the present invention, different from the conventional type of speed detecting apparatus, an expression for computing moving speed is not affected by the mounting angle of the speed detecting apparatus or by the posture of a person carrying the apparatus or the like, so that an accurate moving speed can always be obtained.

As described in relation to conventional technology, a reflection factor of electric waves transmitted from the speed detecting apparatus to the ground surface at the ground surface (electric wave absorption at the ground surface) depends on the state (material) of the ground surface and frequency. Hence, in a method in which electromagnetic waves each having the same frequency are transmitted from 2 units of horn antenna, sometimes electric waves transmitted from one horn antenna are completely absorbed by the ground and reflection waves from the ground surface can not be obtained, thus measurement of moving speed being disabled.

In the speed detecting apparatus according to the present invention, two frequencies are transmitted, so that the reflection factors for the frequencies at the ground surface are different from each other. If it is possible to detect reflection waves from the ground surface for even one of the two transmitted signals of different frequencies, it is possible to compute moving speed through the expression (5) by using a setting angle θ of the speed detecting apparatus (computed through the expression (4)) computed previously for detecting moving speed and a Doppler frequency fd1 or fd2 (computed through the expression (2) or (3)). For this reason, the problem in conventional technology of impossibility to compute moving speed is solved.

In the speed detecting apparatus described above, two Doppler frequencies fd1 and fd2 are obtained by the first and second transmitting/receiving systems 101 and 102, but furthermore a third transmitting/receiving system may be added to obtain a Doppler frequency fd3.

For instance, if a third transmitting/receiving system is installed so that the antenna direction of propogation will be at 90 degrees from a plane formed by the antenna direction of the first transmitting/receiving system 101 and that of the second transmitting/receiving system 102, namely if the third transmitting/receiving system is installed so that the antenna direction is at 90 degrees from the directivities of the other antennas, the relation of the Doppler frequency fd3 with fd1 and fd2 is the same as that of the Doppler frequency fd2 with fd1 as expressed by the relational expressions (2) to (5).

For this reason, in case of the configuration of the first transmitting/receiving system 101 and the second transmitting/receiving system 102, even if there is inclination of the speed detecting apparatus in the moving direction, detection of accurate speed is possible. However, in the configuration with a third transmitting/receiving system added thereto, as in the present variant, even if the speed detecting apparatus is inclined in any direction, it is possible to realize a speed detecting apparatus which can always execute accurate detection of a speed without generating detection error.

Figure 6:
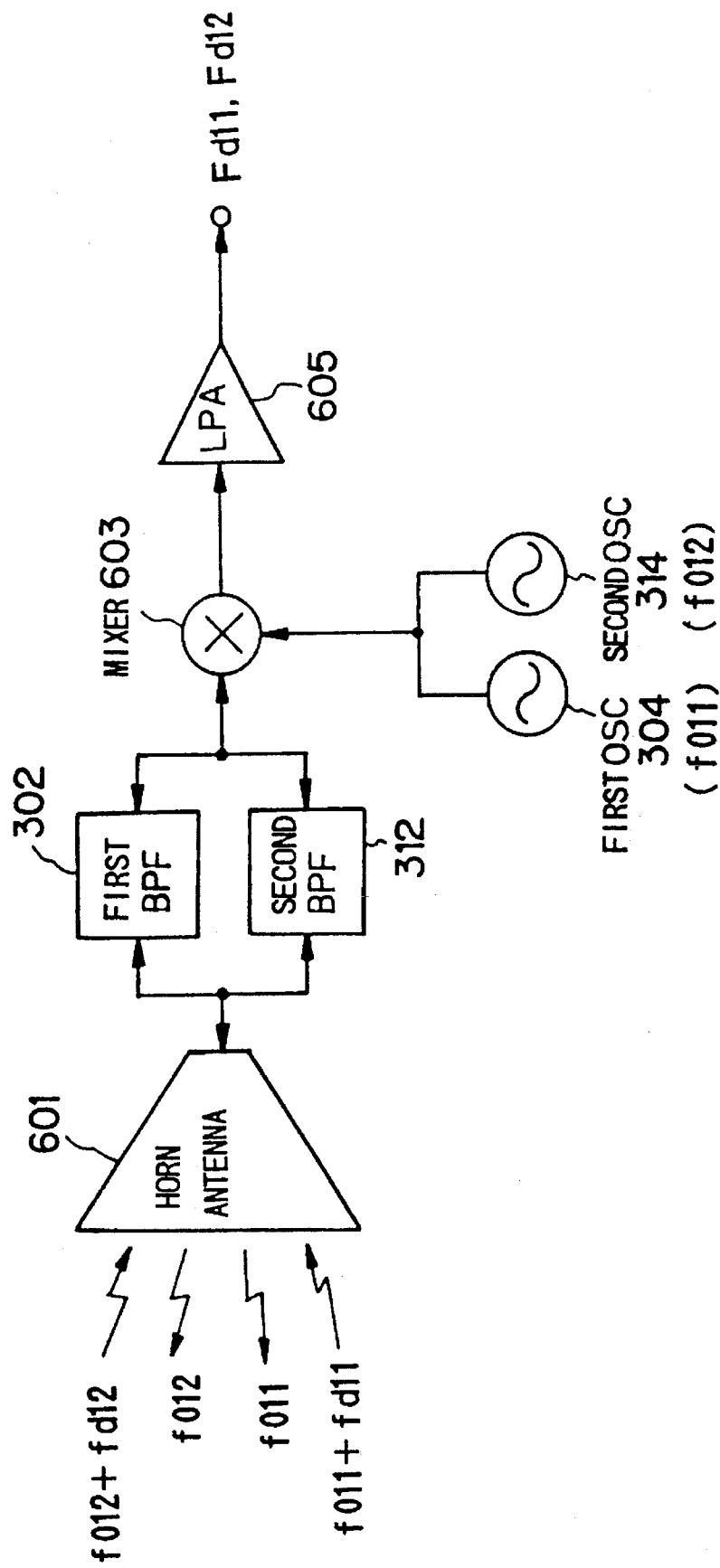
FIG. 6 is a block diagram of a first transmitting/receiving system in a speed detecting apparatus according to Embodiment 2 of the present invention.

FIG. 6 is a block diagram of a first transmitting/receiving system in the speed detecting apparatus according to Embodiment 2 of the present invention. The speed detecting apparatus according to the present invention has basically the same configuration as that in Embodiment 1, but 2 units of local oscillator for transmission/receiving and 2 units of band pass filters are provided in the first transmitting/receiving system 101 and the second transmitting/receiving system 102 respectively. Hence, 2 electromagnetic waves each having a different frequency can be transmitted from one transmitting/receiving system. For this reason, electromagnetic waves of different frequencies are successively transmitted from horn antennas provided in the first transmitting/receiving system 101 and second transmitting/receiving system 102 respectively. Reflection waves for each of the transmitted waves are received to detect a Doppler frequency thereof, and thus moving speed is computed.

In this figure, the first transmitting/receiving system 101 of the speed detecting apparatus according to the present embodiment comprises a horn antenna 601, a first band pass filter (BPF) 302, a second band pass filter 312, a mixer 603, a first local oscillator(OSC) 304 for transmission/receiving with an oscillation frequency of f011, a second local oscillator 314 for transmission/receiving with an oscillation frequency of f012, and a low pass amplifier (LPA) 605.

In the speed detecting apparatus according to the present invention, by producing the first local oscillator 304 for transmission/receiving (with an oscillation frequency of f011) and second local oscillator 314 for transmission/receiving (with an oscillation frequency of f012) alternately, an output signal Fd11 with a Doppler frequency fd11 and an output signal Fd12 with a Doppler frequency of fd12 are obtained at a Doppler frequency output terminal of the first transmitting/receiving system 101 at a timing synchronized to these local oscillators for transmission/reception. It should be noted that, also in the second transmitting/receiving system 102, two types of output signals Fd21 and Fd22 are obtained.

Herein, if the oscillation frequencies f011 and f012 generated by the first local oscillator 304 and second local oscillator 314 respectively are set at values each largely different from each other (for instance, at 10 GHz and 20 GHz), a reflection factor for each wave at the ground surface largely varies according to the oscillation frequency generated by each local oscillator, so that fluctuation of the reflection factor due to differences in ground conditions can be mitigated.

Namely in the present embodiment, signal processing is executed in a signal processing section by using the output signal Fd11 with a Doppler frequency of fd11, output signal Fd12 with a Doppler frequency of fd12 or the like obtained as described above. Thus, in Embodiment 1 it is necessary to compute moving speed by using a setting angle and a Doppler frequency computed in a previous operation for detecting a moving speed if only one of the reflection waves of different frequencies from the ground surface can be detected as a result of the reflection factor at the ground surface. In the present embodiment, however, moving speed can be computed according to values actually detected, which makes it possible to detect moving speed at higher precision under stable conditions.

Also it is allowable that the first local oscillator 304 and second local oscillator 314 are integrated into a variable frequency oscillator (such as, for instance, a voltage control oscillator; VCO) for shared use.

In this case, also the first band pass filter 302 and second band pass filter 312 are integrated into a variable band pass filter, so that the pass bandwidth of the filter will change in correlation to the oscillation frequency of the variable frequency oscillator. Also in configurations where these filters are removed, actually no problem occurs although there occurs slight interference caused by other signals.

By executing frequency scanning using a variable frequency oscillator as in this variant, the probability of occurrence of a state where reflection waves can not be obtained due to ground conditions can be reduced, and more stable and accurate detection of a moving speed can be obtained.

Figure 7:
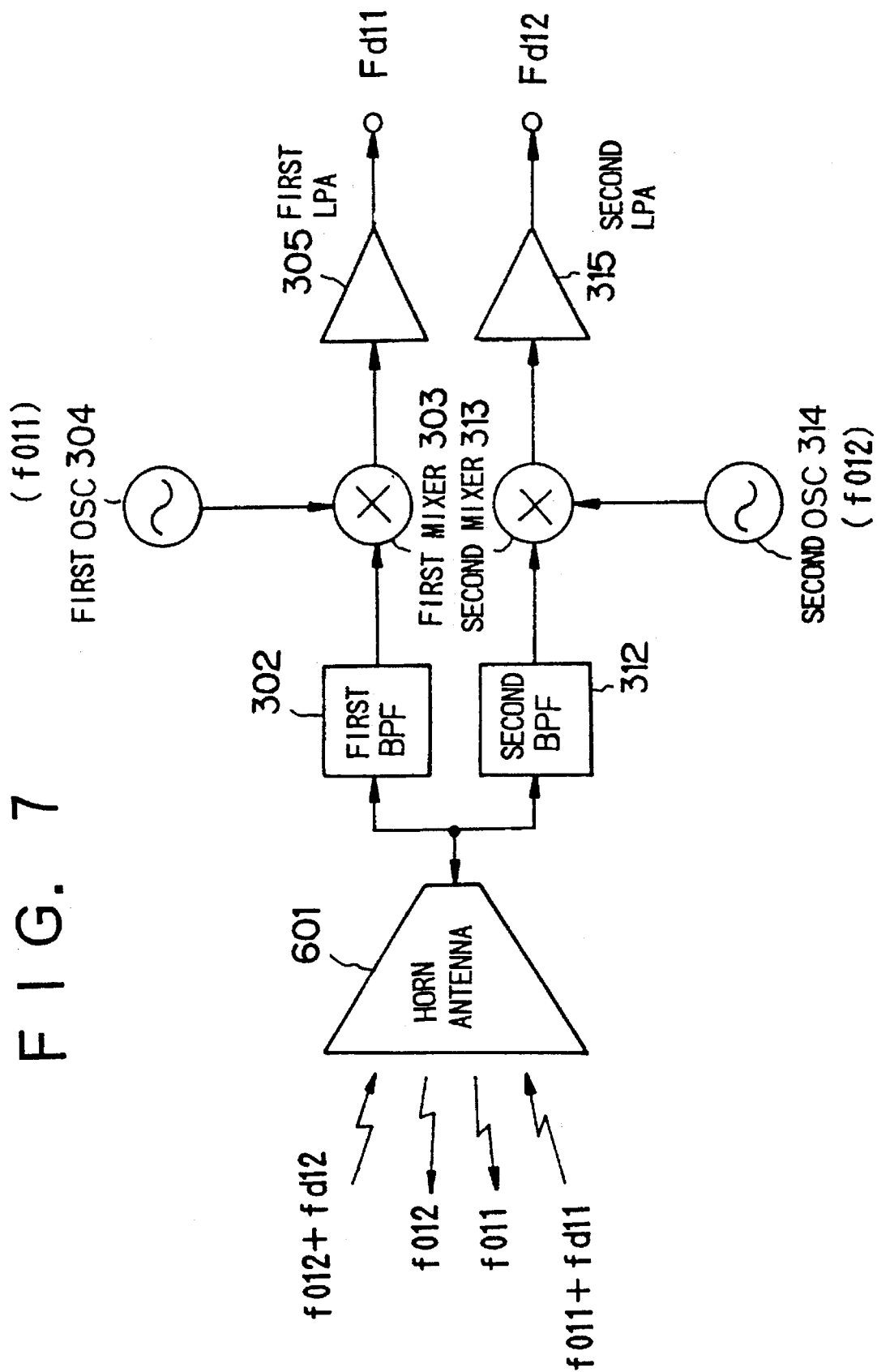
FIG. 7 is a block diagram of a first transmitting/receiving system in a speed detecting apparatus according to Embodiment 3 of the present invention.

FIG. 7 is a block diagram of a first transmitting/receiving system in the speed detecting apparatus according to Embodiment 3 of the present invention. The speed detecting apparatus according to the present embodiment has basically the same configuration as that of Embodiment 1. However, 2 units of local oscillator for transmission/receiving, 2 units of band pass filters, 2 units of mixers, and 2 units of low pass amplifiers are provided in the first transmission/receiving system 101 and second transmission/receiving system 102 respectively so that two electromagnetic waves of different frequencies can be transmitted from one transmitting/receiving system. For this reason, electromagnetic waves of different frequencies are successively transmitted from the first transmitting/receiving system 101 and second transmitting/receiving system 102. Moving speed is computed by receiving reflection waves for each frequency of electromagnetic waves and detecting a Doppler frequency thereof.

In this figure, the first transmitting/receiving system 101 in the speed detecting apparatus according to the present invention comprises a horn antenna 601, a first band pass filter (BPF) 302, a second band pass filter 312, a first mixer 303, a second mixer 313, a first local oscillator (OSC) 304 for transmission/receiving with an oscillation frequency of f011, a second local oscillator 314 for transmission/receiving with an oscillation frequency of f012, a first low pass amplifier (LPA) 305, and a second low pass filter 315.

In the speed detecting apparatus according to the present embodiment, the first local oscillator 304 (with an oscillation frequency of f011) and second local oscillator 314 (with an oscillation frequency of f012) can be driven without being switched alternately. An output signal Fd11 with a Doppler frequency of fd11 and an output signal Fd12 with a Doppler frequency of fd12 are obtained at a Doppler frequency output terminal in the first transmitting/receiving system 101. It should be noted that the two types of output signals Fd21, Fd22 are obtained also in the second transmitting/receiving system 102.

Also in the present embodiment, signal processing is executed in a signal processing section by using the output signal Fd11 with a Doppler frequency fd11, output signal Fd12 with a Doppler frequency fd12, or the like each obtained as described above, so that, in Embodiment 1, it is necessary to compute moving speed by using a setting angle and a precomputed Doppler frequency if only one of the reflection waves of two different frequencies from the ground surface can be detected due to the effect of reflection factor at the ground surface. In the present embodiment, however, moving speed can be computed according to values actually detected, which makes it possible to detect moving speed at higher precision under stable conditions.

In the speed detecting apparatus according to Embodiment 1, Embodiment 2, or Embodiment 3, a configuration is also allowable in which a mode setting section 106 for setting an operating mode is provided as shown in FIG. 1. An operating mode set in the mode setting section 106 is supplied through the I/O interface 104 to the signal processing section 103 so that (1) the oscillation frequency f011 generated by the first local oscillator 304 in the first transmitting/receiving system 101, (2) the oscillation frequency f012 generated by the second local oscillator 314, or (3) a variable frequency range in a variable frequency oscillator is identified by the signal processing section 103.

As described above, by setting an oscillation frequency according to various types of operating environments or operating modes such as walking, jogging, or other types of sports, it becomes possible to detect moving speed at a higher speed more accurately.

The speed detecting apparatus according to the present embodiment has the same configuration as that in Embodiment 1, Embodiment 2, or Embodiment 3, but executes control over intermittent operation in which a driving time of a transmitting/receiving system is changed according to the rate of a change of moving speed computed with the signal processing section 103.

When taking into consideration a range for speed detection in various moving modes from walking to high speed movement as in sports (from 1 Km/h to 100 Km/h), the Doppler frequency is in a range from several tens to several thousands KHz. In addition, when trying to reduce the size of the speed detecting apparatus for portability, it is necessary to use batteries as a power supply unit. Under the conditions described above, in order to insure use for a long time, it is required to reduce power consumption rate in the apparatus by intermittently driving the transmitting/receiving system.

In order to reduce power consumption by intermittently driving the transmitting/receiving system, a time ratio when the transmitting/receiving system is running should be made as small as possible. However, there are some limits concerning the time for intermittent operation, such as that a Doppler frequency to be detected may sometimes be at a very low level such as around 10 Hz, or that detection error should not occur even when moving speed changes rapidly.

To overcome the problems as described above, the approach proposed herein features that specifications for intermittent operations are always optimized according to the rate of change of Doppler frequency applied to the signal processing section 103 to achieve the two objects of reducing power consumption and insurance of precision in speed detection.

Figure 8:
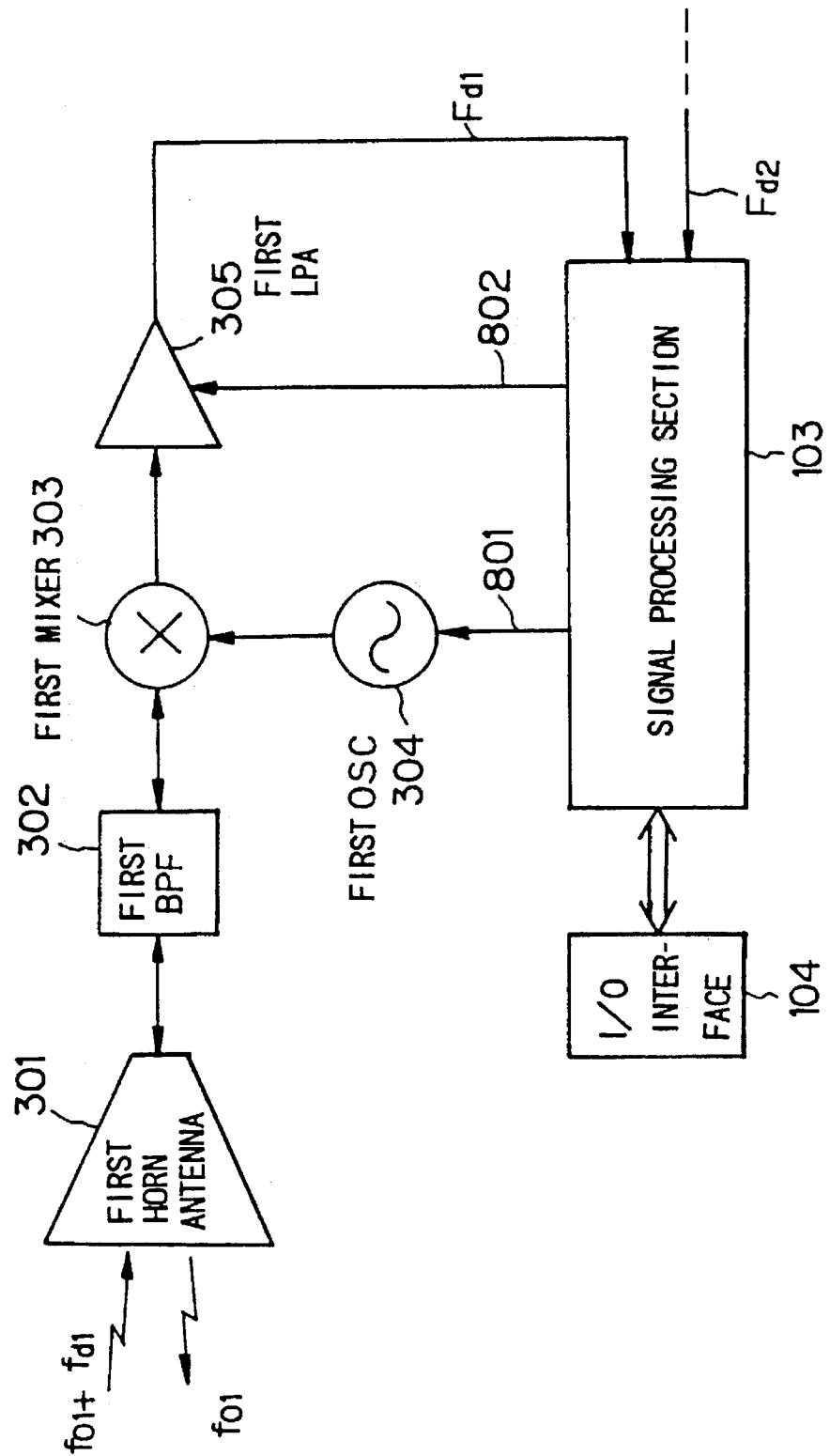
FIG. 8 is a block diagram of a signal processing section, an I/O interface, and a first transmitting/receiving system in a speed detecting apparatus according to Embodiment 4 of the present invention.

FIG. 8 is a block diagram of the signal processing section 103, I/O interface 104, and first transmitting/receiving section 101 in the speed detecting apparatus according to the present embodiment. This figure shows a case where the configuration above is applied to Embodiment 1, wherein control signals 801, 802 from the signal processing section 103 are supplied to the first local oscillator 304 and first low pass amplifier 305 respectively. It should be noted that, when the configuration is applied to Embodiment 2 or Embodiment 3, control signals from the signal processing section 103 are supplied to the first local oscillator 304, second local oscillator 314, and first low pass amplifier 305 or second low pass amplifier 315.

The signal processing section 103 is realized by a microcomputer generally used in electric domestic commodities, for instance an 8-bit microprocessor such as MC 6809 series or Z80 series. Stored in a memory in the signal processing section 103 are a plurality of data tables in which cycle of intermittent operation and/or ratio of driving time for intermittent operation control are set according to conditions set in the mode setting section 106.

In the signal processing section 103, control over intermittent operation according to a rate of change of computed moving speed is executed with reference to the data table according to an operating mode set in the mode setting section 106. More specifically, power supply to components with high power consumption rate, namely power supply to local oscillators 304, 314 and low pass amplifiers 305, 315, is stopped according to control signals 801, 802 respectively to stop the operation.

Figure 9:
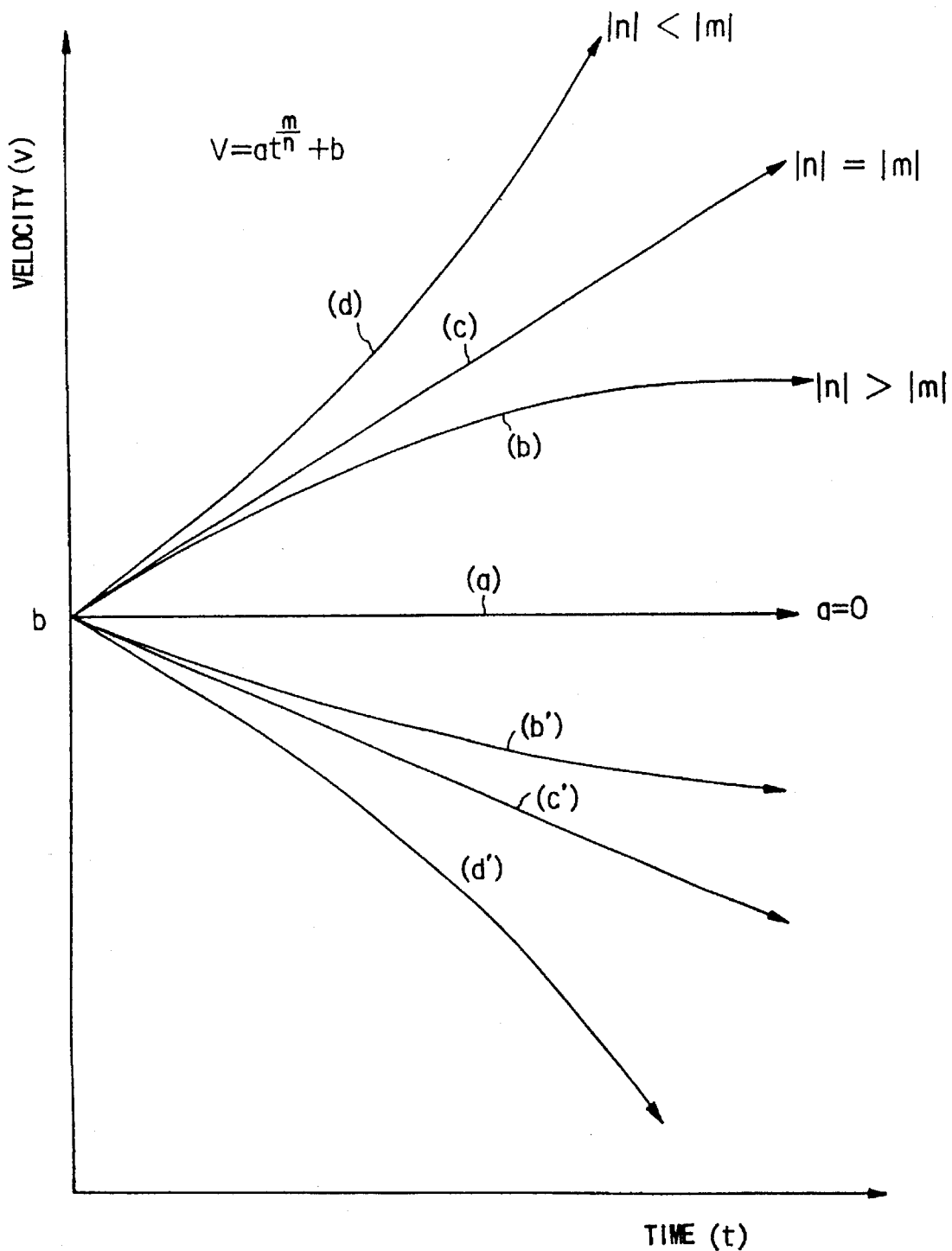
FIG. 9 is a view showing time vs speed characteristics for explanation of various states in which moving speed changes.

FIG. 9 is a view illustrating the time vs speed characteristics in various states in which moving speed changes. In this figure, (a) indicates uniform motion (acceleration a=0), (c) indicates uniformly accelerated motion (n=m), (b) and (d) indicate a state in which the acceleration a is decreasing (n>m) or increasing (n<m), and (b'), (c'), and (d') indicates a state in which, contrary to the characteristics in (b), (c), and (d), speed is decreasing.

A percentage η of intermittent operation in a speed detecting apparatus is defined by the following expression.

$$\eta=\{\text{operating time}/(\text{operating time}+\text{operation down time})\}\times 100 \quad (\%) \tag{6}$$

The percentage of an intermittent operation varies as follows according to each of the characteristics (a), (b), (c) and (d) shown in FIG. 9.

During uniform motion (a): $1/\infty\%$

During uniformly accelerated motion (c): Substantially constant although it depends on a speed change rate a In case where acceleration changes as indicated by (b), (d): In case of (b), the percentage of an intermittent operation decreases as time goes by, but in case of (d), the percentage increases as time goes by.

In actual use, the percentage of intermittent operation is related to an application of a speed detecting apparatus. Namely a plurality of data tables, in which data specifying a percentage of an intermittent operation is registered according to an application such as speed detection during walking, sports, or driving a car, and also according to the speed change patterns (a) to (d) above, are provided. Percentage of intermittent operation during the next operation is optimized according to moving speed information (change rate) computed in the signal processing section 103 and with reference to the data tables.

Detailed description is made below with reference to specific examples. In the present embodiment, operational specifications for intermittent operation, a percentage of which varies according to a purpose of application, are set in the data tables. Namely, specifications for intermittent operation are optimized according to speed of a moving body as well as to frequency of occurrence of speed change for saving the battery power.

Herein, the three types of operating mode are assumed as specific examples of operating mode.

A) Walking or jogging mode: 1Km/h to 30 Km/h
B) Sports mode: 1 km/h to 30 Km/h
C) Vehicle mode: 1 Km/h to 30 Km/h Then, in order to decide specifications for intermittent operation, it is necessary to decide a cycle of intermittent operation and a percentage thereof. Assuming that the cycle is 10 sec and the percentage of operating time is 10%, operation is executed for 1 sec and the operation is down for 9 sec.

Figure 10:
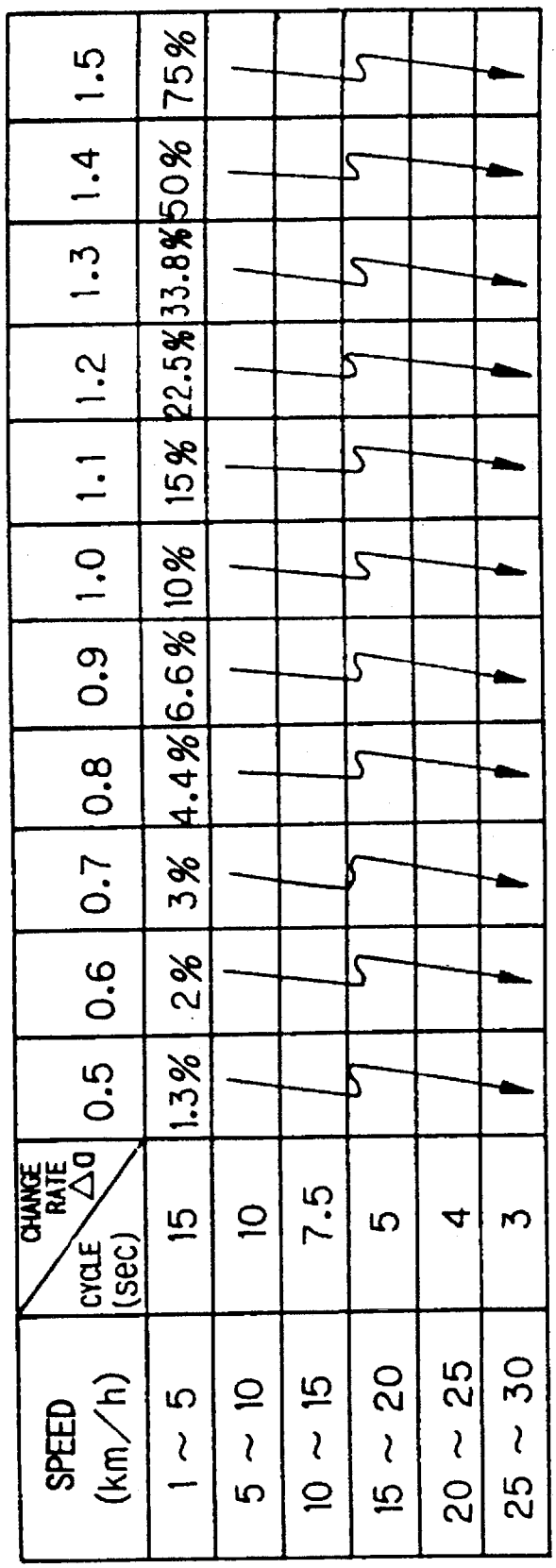
FIG. 10 is an explanatory view showing a data table in which are stored specifications for an intermittent operation in case of the walking jogging mode in Embodiment 4.

Next, a description is made for specific examples for intermittent operation in each type of operating mode. An example of a data table of specifications for intermittent operation in the case of walking or jogging mode is shown in FIG. 10. In FIG. 10, a cycle of intermittent operation is determined according to moving speed, and values from 0.5 to 1.5 indicate rate of change of acceleration. It is expressed by the following;

$$\Delta a=|\Delta V1|/|\Delta V2| \tag{7}$$

Herein $|\Delta V1|$ and $|\Delta V2|$ indicate the absolute value of the time integration value of the velocity V shown in FIG. 9 respectively. The time integration value for the velocity V is computed from speed change as a function of time.

Values from 1.3 to 75 in FIG. 10 are values each indicating percentage of intermittent operation expressed with %. For instance, in case of intermittent operation when moving speed is in a range from 10 to 15 Km/h, assuming that $\Delta a$ is 1 (in case of a uniformly accelerated motion), the cycle is 7.5 sec and percentage of intermittent operation is 10%, so that operation is continued for 750 m/sec and the operation is kept down for 6750 m/sec.

Namely, in FIG. 10, as moving speed increases, the cycle of intermittent operation becomes shorter, and as the rate of change of acceleration increases, the percentage of intermittent operation also increases.

The time integration value for velocity v described above is derived from a prior computation as well as based on current velocity data, so that past data is not available in the default stage when power is turned ON, and computing is impossible. For this reason, it is necessary to predetermine specifications for intermittent operation for the initial state. As for specifications for intermittent operation in this initial state, for instance, if a cycle for measurement of velocity in a range from 25 to 30 Km/h is 3 sec, then the percentage of intermittent operation is set to 75%.

Then, specifications for an intermittent operation in a sports mode or a vehicle mode are determined taking into consideration matters such as specifications for intermittent operation for walking/jogging mode with reference to data tables as shown in FIG. 10.

a) a range of velocity is different
b) frequency of occurrence of velocity change is different Namely, the range of percentage of time of intermittent operation is set to a small value (for instance in a range from 5% to 100%).

It should be noted that, although operation of local oscillator becomes unstable immediately after power is turned ON, in the speed detecting apparatus according to the present invention, because of practical restrictions due to Doppler frequency and size of horn antenna, generally a frequency of 10 GHz or more is used and for this reason such problems as described above do not occur in intermittent operation because the time when the operation becomes unstable is at an order of μ second.

Although any specific restriction is provided each of the descriptions above, a transmitting/receiving system may be built as a microwave plane circuit to minimize size of the apparatus.

As described above, the speed detecting apparatus according to the present invention comprises a plurality of transmitting/receiving systems each having a different antenna directivity set at a different angle, and moving speed is computed by a signal processing section according the Doppler frequency detected by a plurality of transmitting/receiving systems. Hence, even if measurement of Doppler frequency is disabled in one of the transmitting/receiving systems due to the effect of the reflection factor of electric waves at the ground surface, measurement can be executed with any of the transmitting/receiving systems having a different antenna directivity. It is thus possible to provide a speed detecting apparatus which can detect moving speed more accurately.

In the speed detection apparatus according to the invention, reflection waves produced by electromagnetic waves of different frequencies are transmitted from local oscillators in transmitters/receivers a plurality of transmitting/receiving systems is received to detect a Doppler frequency. Moving speed is computed according to a plurality of Doppler frequencies detected by a plurality of transmitting/receiving systems, so that it is possible to provide a speed detecting apparatus in which electromagnetic waves of different frequencies are transmitted from a plurality of transmitting/receiving systems each having different antenna directions of wave propogation. An accurate moving speed can always be detected without being affected by mounting angle of the speed detecting apparatus, or by posture of a person carrying the apparatus. Also, it is possible to provide a speed detecting apparatus in which , as different types of electromagnetic wave each having a different frequency are transmitted, reflection waves produced by the electromagnetic waves of different frequencies at the ground surface are specific to each frequency. Moving speed can be detected more accurately by computing the installation angle of the speed detecting apparatus and previously computed Doppler frequency on the condition that even only one. of reflection waves from the ground surface produced by the plurality of transmitted waves of different frequencies can be detected.

In the speed detecting apparatus according to the present invention, different electromagnetic waves of different frequencies are successively transmitted from antennas provided in a plurality of transmitting/receiving systems, and reflection waves are received to detect a Doppler frequency. Hence, even if only one of two reflection wave from the ground surface can be detected, it is possible to compute moving speed according to actually detected values without computing moving speed using the installation angle of the speed detecting apparatus and previously computed Doppler frequency, which enables more accurate detection of moving speed under stable conditions.

In the speed detecting apparatus according to the present invention, a plurality of means or local oscillators for transmission/receiving for oscillating at a different frequency respectively in transmitters/receivers plurality of transmitting/receiving systems are shared by one variable frequency oscillator. Reflection waves when different types of electromagnetic waves each having a different frequency are successively transmitted from a plurality of transmitting/receiving system are received to detect a Doppler frequency, so that a more compact device can be realized with fewer components.

In the speed detecting apparatus according to the present invention, an oscillation frequency generated by a local oscillator for or a variable frequency oscillator in transmitters/receivers in a plurality of transmitting/receiving systems is identified according to an operating mode set in a mode setting section. Hence, more accurate moving speed detection can be executed by setting the oscillation frequency according to an operating environment in which the speed detecting apparatus is actually used.

In the speed detecting apparatus according to the present invention, intermittent operation is controlled by changing a driving time of a plurality of transmitting/receiving systems according to rate of change of computed moving speed, so that power consumption can be reduced with an optimal environment in which the speed detecting apparatus is actually used.

In the speed detecting apparatus according to the present invention, a plurality of data tables in which a cycle of intermittent operation and a percentage of driving time each for intermittent operation control are set according to an operating mode set in the mode setting section are provided in the signal processing section. Intermittent operation control is executed in the signal processing section by referring to the data tables and according to rate of change of computed moving speed, so that power consumption can be reduced with an optimal apparatus well suited to an operating environment in which the speed detecting apparatus is actually used. Also, specification setting and maintenance can easily be carried out because control specifications for intermittent operation are set in the data table.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A speed detecting apparatus mounted on an object moving on the ground and computing a moving speed by receiving a reflection wave produced by a microwave signal or a millimeter signal transmitted to the ground and detecting a Doppler frequency, comprising:

a plurality of transmitting/receiving systems, each having an antenna and a transmitter/receiver, and each transmitting/receiving electromagnetic radiation at a different frequency; and a signal processing section for computing moving speed according to a Doppler frequency detected by said plurality of transmitting/receiving systems;

said plurality of transmitting/receiving systems each having a different antenna and set at a different angle, respectively.

2. A speed detecting apparatus mounted on an object moving on the ground and computing a moving speed by receiving a reflection wave produced by a microwave signal or a millimeter signal transmitted to the ground and detecting a Doppler frequency, comprising:

a plurality of transmitting/receiving systems each having an antenna and a transmitter/receiver; and a signal processing section for computing moving speed according to a Doppler frequency detected by said plurality of transmitting/receiving systems;

said plurality of transmitting/receiving systems each having a different antenna and set at a different angle, respectively;

wherein said signal processing section controls an intermittent operation of the apparatus by changing a driving time for said plurality of transmitting/receiving sections according to rate of change of said computed moving speed.

3. A speed detecting apparatus according to claim 2, further comprising a mode setting section for setting therein an operating mode, wherein said signal processing section has a plurality of data tables in which a cycle of intermittent operation and a percentage of driving time are set for said intermittent operation control, and said signal processing section controls the intermittent operation according to rate of change of said computed moving speed by referring to said data tables.

4. A speed detecting apparatus mounted on an object moving on the ground and computing a moving speed by receiving a reflection wave produced by a microwave signal or a millimeter signal transmitted to the ground and detecting a Doppler frequency, comprising:

a plurality of transmitting/receiving systems each having an antenna and a transmitter/receiver; and a signal processing section for computing moving speed according to a Doppler frequency detected by said plurality of transmitting/receiving systems;

said plurality of transmitting/receiving systems each having a different antenna and set at a different angle, respectively, wherein said plurality of transmitting/receiving systems have one unit of antenna and a plurality of transmitter/receivers or local oscillators for transmission/reception sharing said one antenna and oscillating at different frequencies respectively, said plurality of transmitting/receiving systems receive reflection waves when electromagnetic waves of different frequencies are successively transmitted from the antennas provided within said transmitting/receiving systems, and detect a Doppler frequency.

5. A speed detecting apparatus according to claim 4, further comprising a mode setting section for setting an operating mode, and an oscillation frequency produced by local oscillators for transmission/reception or a variable frequency oscillator provided in said transmitters/receivers within said plurality of transmitting/receiving systems is identified according to an operating mode set in the mode setting section.

6. A speed detecting apparatus according to claim 4, wherein said local oscillators oscillating at different frequencies in said transmitters/receivers in a plurality of transmitting/receiving systems are shared by one or more units of variable frequency oscillators, and said plurality of transmitting/receiving systems receive reflection waves when electromagnetic waves of different frequencies are successively transmitted, and detect a Doppler frequency.

7. A speed detecting apparatus according to claim 6, further comprising a mode setting section for setting an operating mode, and an oscillation frequency produced by said local oscillators or variable frequency oscillator provided in transmitters/receivers within said plurality of transmitting/receiving systems is identified according to an operating mode set in the mode setting section.

8. A speed detecting apparatus according to claim 1, wherein each transmitter/receiver in said plurality of transmitting/receiving systems has a local oscillator for transmission/reception oscillating at said different frequency respectively, a Doppler frequency when electromagnetic waves of different frequencies are transmitted is received to detect a Doppler frequency, and said signal processing section computes moving speed according to a plurality of Doppler frequencies detected by said plurality of transmitting/receiving systems.

9. A speed detecting apparatus according to claim 8, further comprising a mode setting section for setting an operating mode, and an oscillation frequency produced by said local oscillators or variable frequency oscillator provided in said transmitters/receivers within said plurality of transmitting/receiving systems is identified according to an operating mode set in the mode setting section.

10. A speed detecting apparatus according to claim 8, wherein said signal processing section controls an intermittent operation of said apparatus by changing a driving time for said plurality of transmitting/receiving sections according to rate of change of said computed moving speed.

11. A speed detecting apparatus according to claim 10, further comprising a mode setting section for setting therein an operating mode, wherein said signal processing section has a plurality of data tables in which a cycle of intermittent operation and a percentage of driving time are set for said intermittent operation control, and said signal processing section controls the intermittent operation according to rate of change of said computed moving speed by referring to said data tables.

12. A speed detecting apparatus according to claim 8, wherein said local oscillators oscillating at different frequencies in said transmitters/receivers within a plurality of transmitting/receiving systems are shared by one or more units of variable frequency oscillator, and said plurality of transmitting/receiving systems receive reflection waves when electromagnetic waves having different frequencies are successively transmitted, and detect a Doppler frequency.

13. A speed detecting apparatus according to claim 12, further comprising a mode setting section for setting an operating mode, and an oscillation frequency produced by said local oscillators or variable frequency oscillator provided in said transmitters/receivers within said plurality of transmitting/receiving systems is identified according to an operating mode set in the mode setting section.

14. A speed detecting apparatus according to claim 8, wherein said plurality of transmitting/receiving systems have one unit of antenna and a plurality of said transmitter/receivers or local oscillators sharing said antenna and oscillating at different frequencies respectively, said plurality of transmitting/receiving systems receive reflection waves when electromagnetic waves of different frequencies are successively transmitted from antennas provided within said transmitting/receiving systems, and detect a Doppler frequency.

15. A speed detecting apparatus according to claim 14, further comprising a mode setting section for setting an operating mode, and an oscillation frequency produced by said local oscillators or variable frequency oscillator provided in said transmitters/receivers within said plurality of transmitting/receiving systems is identified according to an operating mode set in the mode setting section.

16. A speed detecting apparatus according to claim 14, wherein said local oscillators oscillating at different frequencies in said transmitters/receivers in a plurality of transmitting/receiving systems are shared by one or more units of variable frequency oscillator, and said plurality of transmitting/receiving systems receive reflection waves when electromagnetic waves of different frequencies are successively transmitted, and detect a Doppler frequency.

17. A speed detecting apparatus according to claim 16, further comprising a mode setting section for setting an operating mode, and an oscillation frequency produced by said local oscillators or variable frequency oscillator provided in said transmitters/receivers within said plurality of transmitting/receiving systems is identified according to an operating mode set in the mode setting section.

18. A method of detecting the ground speed of a moving object, comprising the steps of:

transmitting from the moving object a plurality of signals within the microwave or millimeter wavelength range, each signal having a different frequency, toward the ground using antennas of different directivities;

receiving at the moving object signals corresponding to the transmitted signals and reflected from the ground; and computing ground speed based upon a Doppler frequency shift in the received signals.

19. A method of detecting the ground speed of a moving object, comprising the steps of:

transmitting from the moving object a plurality of signals within the microwave or millimeter wavelength range, toward the ground using antennas of different directivities;

receiving at the moving object signals corresponding to the transmitted signals and reflected from the ground; and computing ground speed based upon a Doppler frequency shift in the received signals;

wherein transmission and reception of signals are intermittently controlled in response to rate of change of computed ground speed.

20. A method as defined in claim 19, including the additional steps of:

establishing databases in which a cycle of intermittent operation and percentages of time for transmitting and receiving signals are stored, and wherein the database is accessed to control intermittent operation in response to rate of change of computed ground speed.

* * * * *